(12) United States Patent
Ryoo et al.

(10) Patent No.: US 12,524,554 B2
(45) Date of Patent: Jan. 13, 2026

(54) DATA STRUCTURE FOR ENCRYPTING SENSITIVE DATA IN AUTONOMOUS SYSTEMS AND APPLICATIONS

(71) Applicant: NVIDIA Corporation, Santa Clara, CA (US)

(72) Inventors: Taek Ryoo, Pleasanton, CA (US); Stephen Wolfe, San Jose, CA (US); Akshay Sharan, Seattle, WA (US); Mihir Joshi, Santa Clara, CA (US); Mustafa Bilgen, Brookline, MA (US); Mahesh Lagadapati, Telangana (IN); Tao Ye, San Jose, CA (US); Santosh Katvate, Maharashtra (IN); Arun Gona, Bothell, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 177 days.

(21) Appl. No.: 18/353,727

(22) Filed: Jul. 17, 2023

(65) Prior Publication Data
US 2025/0005172 A1    Jan. 2, 2025

(30) Foreign Application Priority Data
Jun. 28, 2023   (IN) .............................. 202311043432

(51) Int. Cl.
*G06F 21/60* (2013.01)
*G06F 21/78* (2013.01)

(52) U.S. Cl.
CPC ............ *G06F 21/602* (2013.01); *G06F 21/78* (2013.01)

(58) Field of Classification Search
CPC ............................. G06F 21/602; G06F 21/78
See application file for complete search history.

(56) References Cited

U.S. PATENT DOCUMENTS

| 7,836,310 | B1 * | 11/2010 | Gutnik | H04L 9/3226 |
| | | | | 713/168 |
| 2017/0310479 | A1 * | 10/2017 | Sato | H04L 9/0861 |
| 2023/0102178 | A1 * | 3/2023 | Chhabra | H04L 9/0866 |
| | | | | 713/190 |
| 2023/0171100 | A1 * | 6/2023 | Eckardt | H04W 12/40 |
| | | | | 713/171 |
| 2023/0409758 | A1 * | 12/2023 | Rodgers | G06F 21/62 |

* cited by examiner

*Primary Examiner* — Sangseok Park
(74) *Attorney, Agent, or Firm* — Maschoff Brennan

(57) ABSTRACT

Embodiments of the present disclosure relate to a method of encrypting a secret storage structure. The method may include storing a secret in a secret storage structure. The secret storage structure may be encrypted by encrypting the secret using a wrap key that is generated based at least on a hardware-based root key and a first context. The secret storage structure may additionally be encrypted by encrypting the secret storage structure using an authentication key that is generated based at least on the hardware-based root key and a second context.

20 Claims, 11 Drawing Sheets

DATA STRUCTURE FOR ENCRYPTING SENSITIVE DATA IN AUTONOMOUS SYSTEMS AND APPLICATIONS

BACKGROUND

Many systems may be configured to protect at least a subset of data as secret, such as, for example, sensor data, encryption keys, video streams, medical data, client-specific data, device secrets, and/or other sensitive information that may be designated for protection from disclosure, substitution, and/or compromise. Some systems may be configured to protect data as secret using a variety of cryptographic encryption and/or authentication techniques. For example, secrets may be encrypted using various applications of symmetric and asymmetric encryption, where encryption and subsequent decryption may be facilitated through one or more generated keys.

In some instances, these systems may use these secrets to perform one or more tasks. For example, a system may correspond to a system of an ego-machine—such as autonomous vehicles, semi-autonomous vehicles, drones, robots, etc.—that may use data protected as secret to perform one or more control operations (e.g., controlling the ego-machine from point A to point B). By way of example and not limitation, in the context of an autonomous vehicle, the vehicle may use substantially real-time video, location data, and/or user information to properly control the vehicle from point A to point B. Continuing the example, the substantially real-time video, location data, and/or user information may be sensitive such that protection from hackers and outside entities attempting to collect and use that information may be useful or required—e.g., to ensure safety of the system and/or to protect personal information. In some instances, one or more secrets may be protected because of the preference of the user. Additionally or alternatively, some industries, companies, and/or standards-such as ISO 26262 related to functional safety of road vehicles—may require that certain types of data or information are protected as secret.

Some approaches to securely storing information include embedding the sensitive information into hardware of a system (e.g., one or more fuses included in the hardware). One limitation of storing sensitive information on hardware associated with the system is the limited storage space. For example, a system may include a finite number of fuses where information may be embedded. Furthermore, sensitive information stored by embedding the information into one or more fuses may not be easily accessible and may not be easily shared with other users, systems, devices, and/or entities that may need access to the sensitive information. As such, storing all sensitive information on hardware may not be feasible.

Other techniques for encrypting sensitive information may use one or more encryption techniques only associated with the software package storing the sensitive information. However, such an approach may not be secure enough and may be prone to leaking information, access by hackers, and/or may not be tied to a structure, hardware, and/or embedded platform. Such problems are exacerbated in product lines where manufacturing and development processes may include multiple parties exchanging parts and information.

SUMMARY

According to one or more embodiments of the present disclosure, a secret storage structure may be implemented, and associated secrete data stored within the secret storage structure may be encrypted and authenticated. In particular, the data stored within the secret storage structure may correspond to one or more secrets, and both the secrets and the secret storage structure may be encrypted. In some embodiments, the secrets may be encrypted using an encryption key (a "wrap key") and/or the secret storage structure itself may be encrypted with a second encryption key (an "authentication key"). In some embodiments, the wrap key and the authentication key may be derived from a hardware-based root encryption key where the wrap key is derived using a first context (a "wrap context") and the authentication key may be derived using a second context (an "authentication context").

In some embodiments, the secret storage structure may be authenticated by decrypting the secret storage structure using the authentication key and subsequently verifying the unique identifier using a cryptographic algorithm. Additionally or alternatively, the one or more secrets may be accessed by decrypting the one or more secrets in the secret storage structure using the wrap key.

In some embodiments, the hardware-based root key may be embedded in hardware of a system associated with the one or more secrets and/or the secret storage structure. For example, the hardware-based root key may be burned into one or more fuses of the system. Additionally or alternatively, the authentication key and the wrap key may be derived from the hardware-based root key using one or more key derivation functions.

Embodiments of the present disclosure may provide the security benefits of storing sensitive information on the hardware of the system while also maintaining the benefits of storage and ease of sharing of a software package. For example, in one or more embodiments of the present disclosure, a root key may be embedded in the hardware of the system (e.g., burned into one or more fuses of the system) thereby harnessing the benefits of secure storage of embedding information on hardware associated with a system. Continuing the example, a wrap key configured to encrypt one or more secrets associated with the system and an authentication key configured to encrypt a secret storage structure where the one or more secrets are stored may be derived from the root key embedded in the hardware of the system. By deriving the wrap key and the authentication key from the hardware-based root key, the secret storage structure and the one or more secrets stored thereon may benefit from the security of information stored on the hardware of the system while also benefitting from the increased storage space, the easier accessibility, and the ease of sharing that comes with storing secrets in a software package.

BRIEF DESCRIPTION OF THE DRAWINGS

The present systems and methods for encrypting and authenticating a secret storage structure for autonomous or semi-autonomous systems are described in detail below with reference to the attached drawing, wherein.

DETAILED DESCRIPTION

Figure 1A:
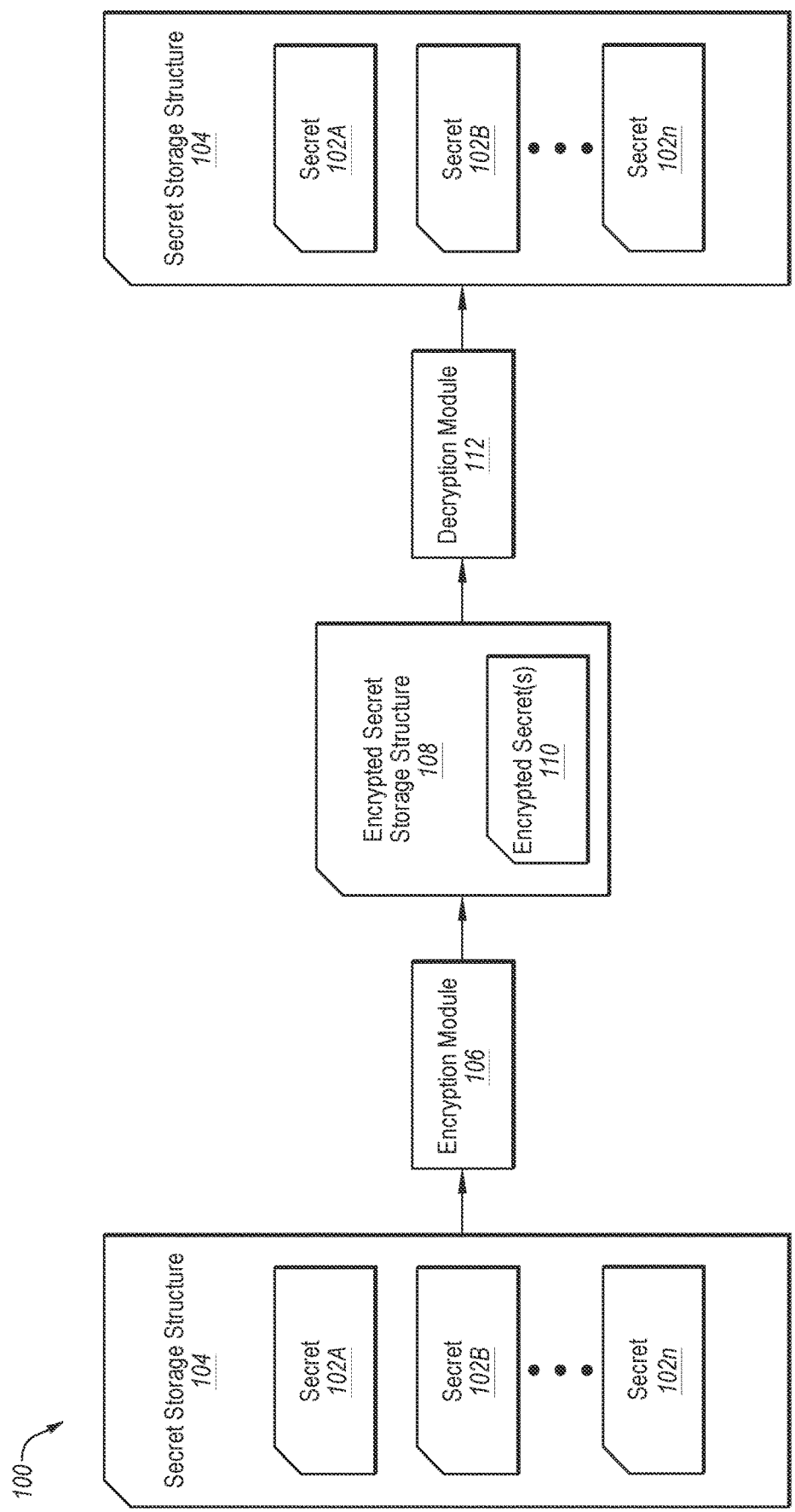
FIG. 1A illustrates an example environment for encrypting and decrypting a secret storage structure, in accordance with some embodiments of the present disclosure.

Systems and methods related to encrypting and authenticating one or more secret storage structures and/or one or more secrets stored in the secret storage structure are disclosed in the present disclosure. For example, one or more embodiments may relate to storing and protecting data corresponding to one or more secrets in a secret storage structure. As used in the present disclosure, a "secret storage structure" or "authentication vault" may refer to a data package including one or more secrets. In some embodiments, the secret storage structure may be protected through authenticated encryption. For example, in some embodiments, contents of the secret storage structure (e.g., one or more secrets included in the secret storage structure) may be encrypted using a "wrap key," which may include any suitable encryption key that may be used to encrypt contents of the secret storage structure. Additionally or alternatively, an authentication key may be used to authenticate the secret storage structure itself. In the present disclosure, any suitable encryption key that may be used to authenticate the secret storage structure may be referred to as an "authentication key." In these and other embodiments, the wrap key and the authentication key may be derived based on one or more hardware-based root keys that may correspond to a system.

One or more of the embodiments disclosed herein may relate to encrypting storage structures and one or more secrets that may be associated with one or more ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous vehicle 400 (alternatively referred to herein as "vehicle 400" or "ego-machine 400") described with respect to FIGS. 4A-4D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be included in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

The embodiments of the present disclosure may help extend the security benefits of storing sensitive information associated with an embedded platform on the hardware itself to software storage structures. For example, some traditional approaches to securely storing information may include embedding the sensitive information into one or more fuses on the structure. One limitation of storing sensitive information on hardware associated with the system is the limited storage space. For example, a system may include a finite number of fuses where information may be embedded. Furthermore, sensitive information stored by embedding the information into one or more fuses may not be easily accessible and may not be easily shared with other users, systems, devices, and/or entities that may need the sensitive information. As such, storing all sensitive information on hardware may not be feasible.

Further, other techniques for encrypting sensitive information may use one or more encryption techniques only associated with the software package storing the sensitive information. However, such an approach may not be secure enough and may be prone to leaking information, hackers, and/or may not be tied to a structure, hardware, and/or embedded platform. Such problems are exacerbated in product lines where manufacturing and development processes may necessitate multiple parties exchanging parts and information.

By contrast, the embodiments of the present disclosure may provide the security benefits of storing sensitive information on the hardware of the system while also maintaining the benefits of storage and ease of sharing of a software package. For example, in one or more embodiments of the present disclosure, a root key may be embedded in the hardware of the system (e.g., burned into one or more fuses of the system) thereby harnessing the benefits of secure storage of embedding information on hardware associated with a system. Continuing the example, a wrap key and an authentication key may be derived from the hardware-based root key. In these and other embodiments, the wrap key may be configured to encrypt one or more secrets associated with the system, and the authentication key may be configured to encrypt a secret storage structure at which the one or more secrets may be stored. By deriving the wrap key and the authentication key from the hardware-based root key, the secret storage structure and the one or more secrets stored thereon may benefit from the security of information stored on the hardware of the system while also benefitting from the increased storage space, the easier accessibility, and the ease of sharing that comes with storing secrets in a software package.

In addition to the benefits of confidentiality and security, one or more embodiments of the present disclosure may include the benefits of authenticating the secret storage structure at which the one or more secrets may be stored. In one or more embodiments of the present disclosure, a unique identifier may be used in conjunction with the authentication key to authenticate the secret storage structure. For example, the secret storage structure may include a first unique identifier that may be generated using a hash function that may be applied to data included in the secret storage structure (e.g., all, substantially all, or some other amount of bits included in the secret storage structure). Additionally, the secret storage structure may be encrypted using an authentication key. Continuing the example, a receiving party, entity, system, user, etc. may decrypt the secret storage structure using the authentication key. Additionally or alternatively, the receiving party may compare the first unique identifier with a second unique identifier generated using the same hash function that may be applied to data included in the received secret storage structure (e.g., all, substantially all, or some other number of bits included in the received secret storage structure). In this example, the receiving party may verify that the secret storage structure may have been encrypted with the authentication key and also verify whether the secret storage structure may have been altered or otherwise corrupted upon receipt by comparing the first unique identifier with the second unique identifier.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

With reference to FIG. 1, FIG. 1 illustrates an example environment 100 for encrypting and decrypting a secret storage structure, in accordance with some embodiments of the present disclosure. The environment 100 may include (data corresponding to) one or more secrets 102 (e.g., secret 102A, secret 102B up to and including a secret 102$n$), an encryption module 104, an encrypted secret storage structure 106, and a decryption module 112. In some embodiments, one or more of these modules may be implemented using hardware including one or more processors, central processing units (CPUs) graphics processing units (GPUS), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In some other instances, one or more of these modules may be implemented using a combination of hardware and software. In the present disclosure, operations described as being performed by a respective module may include operations that the respective module may direct a corresponding computing system to perform. In these or other embodiments, one or more of these modules may be implemented by one or more computing devices, such as that described in further detail with respect to FIGS. 4A-4D, 5, and/or 6.

The one or more secrets 102 may include one or more bits and/or bytes of data. In some embodiments, the one or more secrets 102 may include sensitive data and/or information that may be designated for protection. For example, one or more secrets 102 may include sensor data, encryption keys, video streams, medical data, client-specific data, device secrets, and/or other sensitive information that may be designated for protection from disclosure, substitution, and/or compromise.

In some embodiments, the one or more secrets 102 may include one or more sets of data that may describe the same or similar types of data. For example, the secret 102A may include a first encryption key, the secret 102B may include a second encryption key up to the secret 102$n$ that may include an nth encryption key. Additionally or alternatively, the one or more secrets may include one or more sets of data that may not describe the same or similar types of data. For example, secret 102A may include an encryption key, secret 102B may include personal client data, and secret 102$n$ may include sensor data.

In some embodiments, the one or more secrets 102 may include data that may be kept secret based on a designation corresponding to a preference of a user and/or a manufacturer. For example, a user may wish that their personal information (e.g., name, birth date, payment information, social security number, etc.) be protected in some manner. Continuing the example, the personal data of the user may then be designated to be included in the one or more secrets 102 to protect the personal data of the user via encryption. Additionally or alternatively, some industries may include system requirements to protect various types of secrets. By way of example and not limitation, the one or more secrets 102 may be used in the control and/or operation of ego-machines (e.g., video streams, location information, etc.) and thus may be subject to the functional safety requirements of ISO 26262 and the various automotive safety integrity levels (ASILs) defined thereby. Further continuing the example, one or more ASILs may require encryption or protection of various types of information; the information may therefore be included in the one or more secrets 102. In these and other embodiments, the one or more secrets 102 may be stored in the secret storage structure 104.

In some embodiments, the secret storage structure 104 may include a package of data that may include one or more secrets 102. In some embodiments, the secret storage structure 104 may be configured to store, transport, and/or share the one or more secrets 102. In some embodiments, the one or more secrets may be fixed in the secret storage structure 104. For example, the secret storage structure 104 may be generated, and the one or more secrets 102 may be stored in the generated secret storage structure 104. Continuing the example, after storing the one or more secrets 102 in the generated secret storage structure 104, no additional secrets and/or data may be added to the secret storage structure 104. An example configuration of a data structure that may include the secret storage structure 104 and/or the encrypted secret storage structure 108 may be illustrated and described with respect to FIGS. 1B-1C in the present disclosure.

In some embodiments, the secret storage structure 104, in addition to the one or more secrets 102, may include a unique identifier—e.g., a Message Authentication Code (MAC), a keyed Hash Message Authentication Code (HMAC), a checksum, and/or other unique identifier used to identify data included in the secret storage structure (e.g., one or more bits in the secret storage structure 104). In some embodiments, the unique identifier may be used to verify that the secret storage structure had not been changed, modified, corrupted, or otherwise altered after having been created. For example, a first unique identifier may be generated using a hash algorithm, where the hash algorithm may be applied to all, or substantially all the data (e.g., bits) included in the secret storage structure 104. In the event that the secret storage structure 104 is shared and/or the data may be verified in the secret storage structure 104, the first unique identifier may be compared with a second unique identifier generated using the same hash function that may be applied to all or substantially all data included in the shared secret storage structure. Continuing the example, in response to the first unique identifier being the same as the second unique identifier, the secret storage structure 104 may not have been altered or otherwise corrupted; by contrast, in response to the first unique identifier being different from the second unique identifier, it may be determined that the secret storage structure 104 may have been altered or otherwise corrupted. In these and other embodiments, the secret storage structure 104 and/or the one or more secrets 102 may be encrypted by the encryption module 106.

In some embodiments, the encryption module 106 may be configured to encrypt and/or protect the one or more secrets 102 in the secret storage structure 104. For example, one or more operations may be performed at the encryption module 106 that may encrypt the one or more secrets 102 using one or more private encryption keys. In the present disclosure, any suitable encryption key that may be used to encrypt the one or more secrets 102 may be referred to as a wrap key. In these and other embodiments, the encryption module 106 may be configured to encrypt the one or more secrets 102 using the same wrap key. For example, data corresponding to the secret 102A, the secret 102B, up to and including secret 102n may be stored and encrypted using one wrap key. In some embodiments, two or more of the secrets 102 may be encrypted using different wrap keys. In these or other embodiments, each of the secrets 102 may be encrypted using a different respective wrap key. For example, the encryption module 106 may be configured to encrypt the secret 102A using a first wrap key, the secret 102B using a second wrap key, up to and including the secret 102n using an nth wrap key.

In some embodiments, the encryption module 106 may be configured to encrypt the secret storage structure 104 as a whole, which may be used to authenticate the secret storage structure 104. In these and other embodiments, a private encryption key separate from the wrap key may be used to encrypt the secret storage structure 104. In the present disclosure, any suitable encryption key that may be used to authenticate the secret storage structure 104 may be referred to as an authentication key.

In some embodiments, the encryption module 106 may be configured to encrypt both the secret storage structure 104 and the one or more secrets 102 using one or more encryption keys. For example, the one or more secrets 102 may be encrypted using one or more wrap keys. Continuing the example, in addition to the one or more secrets 102 being encrypted, the secret storage structure 104 may be encrypted using an authentication key. In some embodiments, the wrap key(s) and/or authentication key(s) may be configured to encrypt and/or decrypt the one or more secrets 102 and the secret storage structure 104 in accordance with one or more block ciphers. By way of example and not limitation, the wrap key and/or the authentication key may be configured to encrypt and/or decrypt data according to one or more advanced encryption standards (e.g., AES-128-CBC, AES-256-CBC, AES-128-GCM, AES-256-GCM, etc.)

In some embodiments, the wrap key and/or the authentication key may be based on another encryption key. In the present disclosure, any suitable encryption key from which the wrap key(s) and the authentication key(s) may be derived may be referred to as a root key(s). For example, in some embodiments, the wrap key and/or the authentication key may be the root key. Additionally or alternatively, the wrap key and/or the authentication key may be generated based on the root key, such as via any suitable key generation scheme. By way of example and not limitation, the authentication key and/or the wrap key may be derived from the root key using a key derivation function ("KDF")—e.g., a KDF based on the National Institute of Standard and Technology Special Publication 800-108 (NIST SP 800-108), Argon2, Scrypt, HMAC-based Extract-and-Expand Key Derivation Function (HKDF) and/or any other suitable cryptographic algorithm used to derive cryptographic keys. In these and other embodiments, the wrap key and/or the authentication key may be derived from the root key using one or more contexts where the one or more contexts as used in the present disclosure may refer to one or more values including one or more data types which may include, for example, strings, chars, integers, floats, Boolean, etc. In some embodiments, the one or more contexts may include one or more unique values, e.g., one or more unique strings specific to a corresponding context. In some embodiments, the one or more contexts may include one or more fixed vectors—e.g., one or more vectors of fixed length. For example, in the context of a computer chip used in a system corresponding to the secret storage structure, the one or more contexts may include a chip ID, where the chip ID may be unique to the computer chip used in the system. A process for deriving the wrap key(s) and/or the authentication key is illustrated and described such as, for example, in FIG. 2.

In some embodiments, the root key may be a hardware-based root key. In some embodiments, a hardware-based root key may indicate that the root key may be embedded in one or more pieces of hardware associated with the secret storage structure. For example, a secret storage structure may store the one or more secrets 102 associated with a system where the system includes one or more hardware components such as, for example, amplifiers, circuits, fuses, CPUs, etc. Continuing the example, a root key may be embedded in one or more pieces in the hardware—e.g., burning the root key into one or more fuses. Further, the root key embedded in the hardware of the system (the "hardware-based root key") may be used to encrypt the secret storage structure 104. In these and other embodiments, the hardware-based root key may additionally be configured to encrypt one or more secrets 102 in the secret storage structure 104.

In these and other embodiments, the encryption of the one or more secrets 102 and/or the secret storage structure 104 may result in the encrypted secret storage structure 108. In these and other embodiments, the encrypted secret storage structure 108 may include the one or more secrets 102 that may have been encrypted using one or more wrap keys that may result in encrypted secret(s) 110. Additionally or alternatively, the encrypted secret storage structure 108 may include the secret storage structure 104 that may, as a whole, have been encrypted using an authentication key and that may have resulted in the encrypted secret storage structure 108.

In some embodiments, the decryption module 112 may be configured to decrypt and/or authenticate the encrypted secret storage structure 108 using the authentication key. In these and other embodiments, the encrypted secret storage structure 108 may be decrypted using one or more authentication keys that may be derived from a root key as described such as, for example, in FIG. 2. For example, the secret storage structure 104 may be encrypted using one or more authentication keys derived from a root key and a context (e.g., one or more fixed values and/or vectors). Further, the decryption module 112 may be configured to derive the authentication key from the root key using the same context used to derive the authentication key to encrypt the secret storage structure 104. Continuing the example, the decryption module 112 may be configured to decrypt the encrypted secret storage structure 108 using the same authentication key used to encrypt the secret storage structure 104.

In some embodiments, "authentication" may include verifying that a known entity (e.g., user, system, company, etc.) used the authentication key to encrypt the secret storage structure 104 as illustrated in the operations performed at the encryption module 106. For example, a secret storage structure 104 may be encrypted using the authentication key. As described with respect to the encryption module 106, the authentication key may be derived from a root key using a particular context (e.g., one or more fixed values and/or vectors) as described and illustrated such as, for example in FIG. 2. Continuing the example, in some instances, the entity (e.g., party, user, system, etc.) that may decrypt the encrypted secret storage structure 108 may be different from the entity that may have encrypted the secret storage structure 104. Further, though the entity decrypting the encrypted secret storage structure 108 may be different, the context used to derive the authentication key used to encrypt the secret storage structure 104 may be the same as the context used to derive the authentication key to decrypt the encrypted secret storage structure 108. Because the context used to derive the authentication key may be the same both for encryption and decryption of the secret storage structure 104 and the encrypted secret storage structure 108 respectively, the entity decrypting the encrypted secret storage structure 108 may verify that a known entity encrypted the secret storage structure 104.

In some embodiments, "authentication" may include verifying that the secret storage structure 104 may correspond to a specific platform or structure. For example, an authentication key may be derived from a root key to encrypt the secret storage structure 104. In some instances, the root key may be a hardware-based root key that may be embedded in the specific platform or structure (e.g., a root key burned into one or more fuses). Further continuing the example, the authentication key used to encrypt the secret storage structure 104 may again be derived to decrypt the encrypted secret storage structure 108. Because the authentication key may be the same to encrypt and decrypt the secret storage structure 104 and the encrypted secret storage structure 108 respectively, the entity decrypting the encrypted secret storage structure 108 may verify that the secret storage structure 104 and the corresponding one or more secrets 102 may be associated with a particular platform and/or structure where the root key may be embedded.

In some embodiments, in addition to authentication using the authentication key, a unique identifier may be used in conjunction with the authentication key as part of the authentication. In some embodiments, the unique identifier may be used to authenticate that the secret storage structure 104 resulting from the decryption module 112 is the same as the secret storage structure 104 prior to being encrypted using operations performed at encryption module 106. For example, the secret storage structure 104 may include a first unique identifier that may be generated using a hash function that may be applied to data included in the secret storage structure 104 (e.g., all, or substantially all bits included in the secret storage structure). Additionally, the secret storage structure 104 may be encrypted using the authentication key such as already described. Continuing the example, the secret storage structure 104 may be decrypted using the authentication key (e.g., decrypted by a receiving party, entity, system, user, etc.). Additionally or alternatively, the first unique identifier may be compared with a second unique identifier generated using the same hash function that may be applied to data included in the secret storage structure 104 after being decrypted using one or more operations at decryption module 112 (e.g., all, or substantially all bits included in the received secret storage structure). In this example, the receiving party may verify that the secret storage structure 104 may have been encrypted and/or decrypted using the same authentication key and also verify whether the secret storage structure 104 may have been altered or otherwise corrupted after having been encrypted.

In some embodiments, the decryption module 112 may be configured to decrypt the encrypted secret(s) 110. In these and other embodiments, the encrypted secret(s) 110 may be decrypted using one or more wrap keys that may be derived from a root key as described such as, for example, in FIG. 2. For example, the one or more secrets 102 may be encrypted using one or more wrap keys derived from a root key and a context (e.g., one or more fixed values and/or vectors). Further, the decryption module 112 may be configured to derive the wrap key from the root key using the same context used to derive the wrap key to encrypt the one or more secrets 102. Continuing the example, the decryption module 112 may be configured to decrypt the encrypted secrets using the same wrap key used to encrypt the one or more secrets 102.

In these and other embodiments, the decryption module 112 may be configured to decrypt and/or authenticate the encrypted secret storage structure 108 which may yield the secret storage structure 104 and/or the one or more secrets 102. In these and other embodiments, the secret storage structure 104 and/or the one or more secrets 102 may be the same before operations performed by the encryption module 106 and after operations performed by the decryption module 112.

Figure 1B:
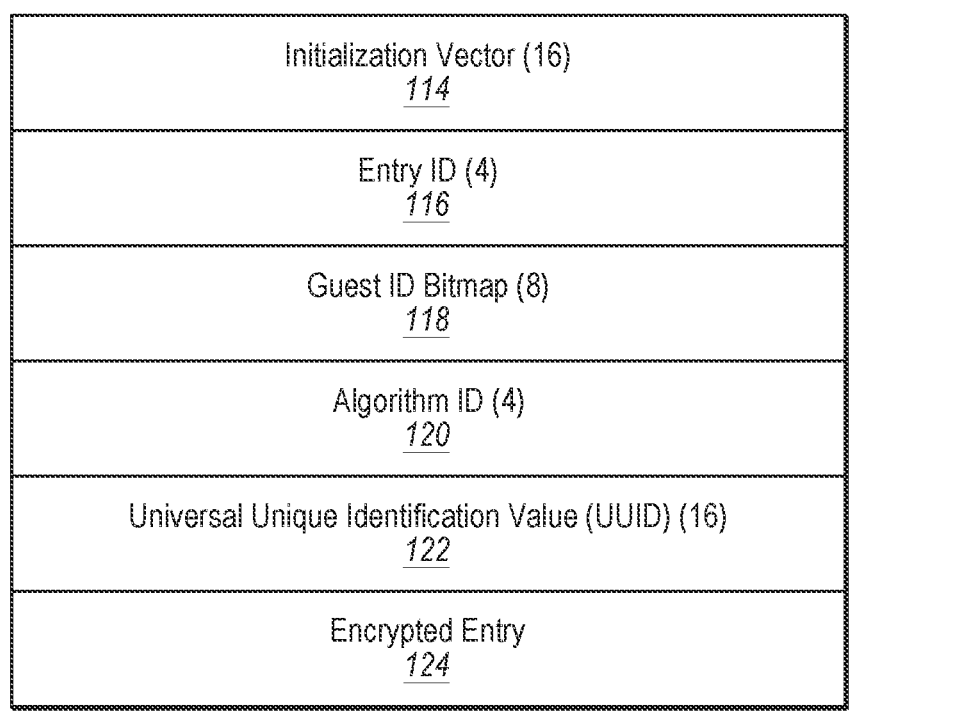
FIG. 1B illustrates an example format for an entry value of a secret storage structure, in accordance with some embodiments of the present disclosure.

FIG. 1B illustrates an example format 150 of an entry value corresponding to data included in the one or more secrets (e.g., the one or more secrets 102) stored in a secret storage structure (e.g., secret storage structure 104), in accordance with some embodiments of the present disclosure. In some embodiments, each of the one or more secrets may be stored in the secret storage structure using a respective entry value. In these and other embodiments, the format 150 of the entry value may include an initialization vector (IV) 114, an entry ID 116, a Guest ID Bitmap 118, an algorithm ID 120, a universal unique identifier (UUID) 122, and/or an encrypted entry 124. As illustrated in FIG. 1B, parenthetical values in one or more entries may illustrate an example number of bytes that may be used to express one or more entries in the format 150.

In some embodiments, the initialization vector 114 may be 16 bytes of data and may include a random or pseudo-random vector that may be used to encrypt an entry in the secret storage structure 104. In these and other embodiments, an "entry" in the secret storage structure 104 may include the one or more secrets that may be stored and/or encrypted in the secret storage structure 104. In some embodiments, the initialization vector 114 may include different numbers and/or vectors per secret in the secret storage structure 104. In some embodiments, the initialization vector 114 may include number(s) and/or vector(s) that may be used to encrypt the one or more secrets 102 that may correspond to the initialization vector 114. In these and other embodiments, the initialization vector 114 may be used in conjunction with one or more wrap keys to encrypt the one or more secrets 102 stored in the secret storage structure 104.

In some embodiments, the entry identification may include one or more values, numbers, vectors, etc. that may identify the one or more secrets 102. In some embodiments, the entry identification 116 may be configured to identify the one or more secrets 102 that may have been stored in the secret storage structure 104. In these and other embodiments, the entry identification 116 may identify the one or more secrets 102 without tying the one or more secrets 102 to a fixed storage slot in the secret storage structure 104. Instead of designating a particular storage location within the secret storage structure 104 for the one or more secrets 102, the one or more secrets 102 may be identified using the entry identification 116.

In some embodiments, the guest ID bitmap 118 may include an access control bitmap field that may restrict and/or allow access to the one or more secrets to specific entities (e.g., users, systems, virtual machines, etc.). For example, a first entity may use and/or access a first secret that may be stored in a first storage location in the secret storage structure. Continuing the example, the guest ID bitmap 118 may include a bitmap field that may be programmed to allow access to the first storage location to the first user. Further continuing the example, a second entity may use and/or access a second secret that may be stored in a second location in the secret storage structure. Additionally or alternatively, in the event the first entity and second entity need access to the first secret and second secret respectively, the guest ID bitmap 118 may allow access to the first entity and second entity to the first storage location and the second storage location respectively.

In some embodiments, the algorithm ID 120 may include data that may define one or more algorithms that may be used to decrypt the one or more encrypted secrets 114 that may be stored in the encrypted secret storage structure 108. In some embodiments, the algorithm ID 120 may include definitions of various encryption and/or decryption algorithms where the algorithms may be used to decrypt the encrypted secret(s) 114. For example, the encryption algorithm(s) may include one or more of algorithms in the American Encryption Standard—e.g., AES-128-CBC, AES-256-CBC, AES-128-GCM, AES-256-GCM, etc.

In some embodiments, the UUID 122 may include one or more numbers, vectors, values, etc. that may be used to access storage location(s) in the secret storage structure 104 to access the one or more secrets 102 and/or the one or more encrypted secrets 110. In these and other embodiments, when the UUID 122 is combined with the entry identification value 116, the combination of the two may combine into a tuple (e.g., {UUID 118, Entry ID 112}) that may identify one of the one or more encrypted secrets 110.

In some embodiments, the encrypted entry 124 may include the one or more encrypted secrets 110. In these and other embodiments, the number of bytes used to store the one or more encrypted secrets 110 may depend on what may be included in the one or more secrets 102 and/or one or more encrypted secrets 110.

Figure 1C:
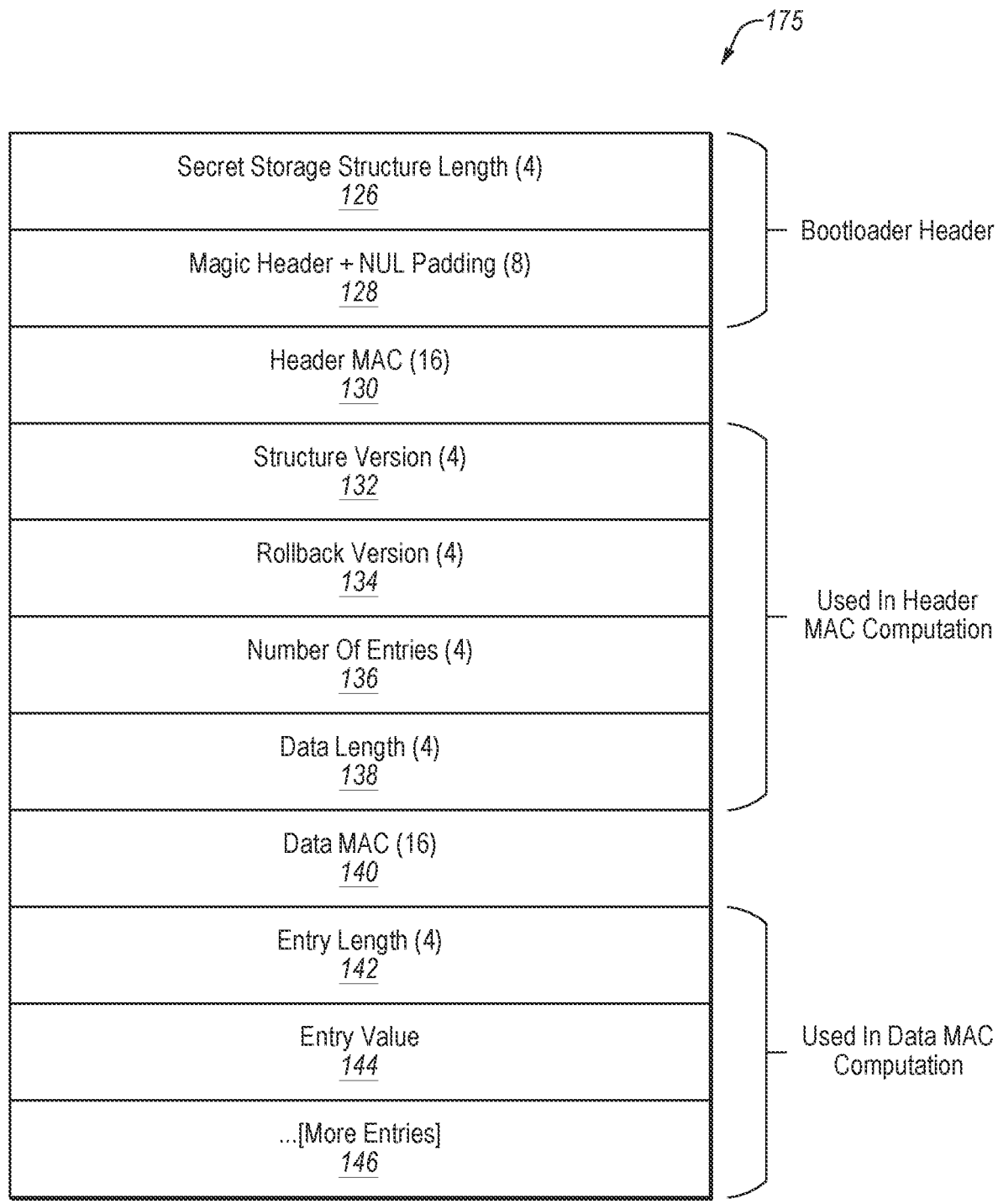
FIG. 1C illustrates an example format for a secret storage structure, in accordance with some embodiments of the present disclosure.

FIG. 1C illustrates an example format 175 of a secret storage structure 104, in accordance with some embodiments of the present disclosure. In these and other embodiments, the format 175 may illustrate an example data structure corresponding to the secret storage structure which may include one or more entry values such as, for example, the format 150 of an entry value described with respect to FIG. 1B. In these and other embodiments, the one or more entry values (e.g., entry value 150) may correspond and/or include one or more secrets stored in the secret storage structure—e.g., one or more secrets 102 stored in the secret storage structure 104.

In these and other embodiments, the example format 175 for the secret storage structure 104 may include a number of entries that may include information which may be used to pass the information in the secret storage structure to a bootloader—referred to herein as "bootloader entries" that may include a secret storage structure length 126 and/or a magic header+padding 128. Further, in some embodiments, the format 175 of the secret storage structure may include a number of entries that may include information corresponding to the secret storage structure itself—referred to herein as "header entries"—which may include a structure version 132, a rollback version 134, a number of entries 136, and/or a data length 138. In some embodiments, the format 175 of the secret storage structure may additionally include one or more entries corresponding to one or more secrets stored in the secret storage structure—referred to herein as "secret entries" which may include an entry length 142, an entry value 144, and/or one or more entries 146 corresponding to the one or more secrets stored in the secret storage structure. In some embodiments, the format 175 of the secret storage structure may include one or more entries including data that may be used to verify information in the header entries and/or the entries corresponding to the one or more secrets which may include the header MAC 130 and/or the Data MAC 140. As illustrated in FIG. 1C, parenthetical values in one or more entries may illustrate an example number of bytes that may be used to express one or more entries in the format 175.

In some embodiments, the secret storage structure length 126 may include data and/or information corresponding to a length of the secret storage structure. In some embodiments, the length of the secret storage structure may include the number of bytes corresponding to entries included in the secret storage structure. For example, the secret storage structure may include one or more of: the magic header+padding 128, the header MAC 130, the structure version 132, the rollback version 134, the number of entries 136, the data length 138, the data MAC 140, the secret length 142, the secret value 144, and the other entries 146. In these and other embodiments, the secret storage structure length 126 may not include a number of bytes corresponding to the secret storage structure length 126.

In some embodiments, the magic header+padding 128 may include data and/or information that may be used by a bootloader. In some embodiments, the magic header+padding 128 may include a number of bytes that may include information corresponding to a distinctive and/or unique value that may identify the secret storage structure. In some embodiments, the distinctive and/or unique value may include a number, a string, a file type and/or other data that may convey information that may be distinctive and/or unique corresponding to the secret storage structure. Additionally or alternatively, the magic header+padding 128 may include a number of padding bits and/or padding bytes. In some embodiments, the padding bits/bytes may increase the number of bytes and/or bits of the secret storage structure to conform with a particular implementation. For example, a particular implementation of the secret storage structure may need to include a first number of bytes for software in a particular system to properly use the secret storage structure (e.g., software used in a system configured to control an autonomous vehicle). Continuing the example, the inclusion of one or more padding bytes may allow the secret storage structure to include a number of bytes that may be equivalent to the first number of bytes that may be necessary to conform to the particular implementation of the secret storage structure.

In some embodiments, a bootloader may use information corresponding to the secret storage structure length 126 and/or the magic header+padding 128 to pass information in the secret storage structure to a trusted source (e.g., entity, system, user, etc.). In some embodiments, the bootloader may verify that information in the magic+padding 128 is correct.

In some embodiments, the header Message Authentication Code (MAC) 130 may include information and/or data including a message authentication hash that may be used on one or more of the header entries included in the secret storage structure. In some embodiments, the message authentication hash may be used to verify that the data and/or information in one or more of the header entries may be correct; in other words, whether the data included in one or more of the header entries may have been altered, corrupted, or otherwise changed. In these and other embodiments, the header MAC 130 may include information that may correspond to any number of hash functions (e.g., one or more of a checksum, a cyclic redundancy check, a hash-based message authentication code (HMAC), etc.).

In some embodiments, the structure version 132 may include information corresponding to a version of a layout of the secret storage structure. For example, the secret storage structure may include three different versions (e.g., version A, version B, and version C). Continuing the example, the different versions may include different numbers of secrets, different data structure layout, etc. Further continuing the example, the structure version 132 may specify for a receiving entity, whether the secret storage structure may be version A, version B, or version C.

In some embodiments, the rollback version 134 may include information corresponding to a rollback level for contents in the secret storage structure. In these and other embodiments, the contents of the secret storage structure may include one or more of the entries specified in the format 175 of the secret storage structure and/or the format 150 of the entry value as described with respect to FIG. 1B. In some embodiments, the rollback level may refer to information corresponding to one or more operations that may return data in the secret storage structure to some previous state.

In some embodiments, the number of entries 136 may include data corresponding to the number of the one or more secrets that may be stored in the secret storage structure. In these and other embodiments, the number of entries 136 may not include information corresponding to the one or more secrets; rather, the number of entries 136 may specify only the number of the one or more secrets stored in the secret storage structure.

In some embodiments, the data length 138 may include a length (e.g., number of bytes and/or bits) included in the entries corresponding to the one or more secrets. In some embodiments, the data length 138 may include the number of bits and/or bytes included in the secret length 142, the secret value 144, and/or the one or more entries 146 corresponding to the one or more secrets stored in the secret storage structure.

In some embodiments, the data MAC 140 may include data that may correspond to a message authentication hash that may be used to verify one or more of the secret entries. In some embodiments, the data MAC 140 may include information corresponding to the same message authentication hash function used in the header MAC 130. In these and other embodiments, the data MAC 140 may verify that the data corresponding to the one or more secrets (e.g., the entry length 142, the entry value 144, and/or the one or more entries 146) may not have been altered, corrupted, or otherwise changed.

In some embodiments, the entry length 142 may include a number of bits and/or bytes corresponding to one of the one or more secrets. In these and other embodiments, each of the one or more secrets may include a format, where the format may include: <entry length> <entry value>. In some embodiments, individual secrets may therefore include an entry length 142 and an entry value 144. For example, a first secret and a second secret may be stored in the secret storage structure. Continuing the example, the secret storage structure may include a first entry length and a first entry value corresponding to the first secret. Additionally, the secret storage structure may include a second entry length and a second entry value corresponding to the second secret.

In some embodiments, the entry value 144 may include the contents of one of the one or more secrets. In these and other embodiments, the one or more secrets may each include an entry value 144 that may include the contents of a respective secret. In some embodiments, the contents of the secret stored in the entry value 144 may include the contents of the entry value format 150 such as, for example, described and illustrated with respect to FIG. 1B.

In some embodiments, one or more entries 146 corresponding to the one or more secrets may be included. For example, the secret storage structure may include a first secret and a second secret stored thereon. Continuing the example, the secret storage structure may therefore include a first entry length, a second entry value, a second entry length entry, and a second entry value.

Figure 2:
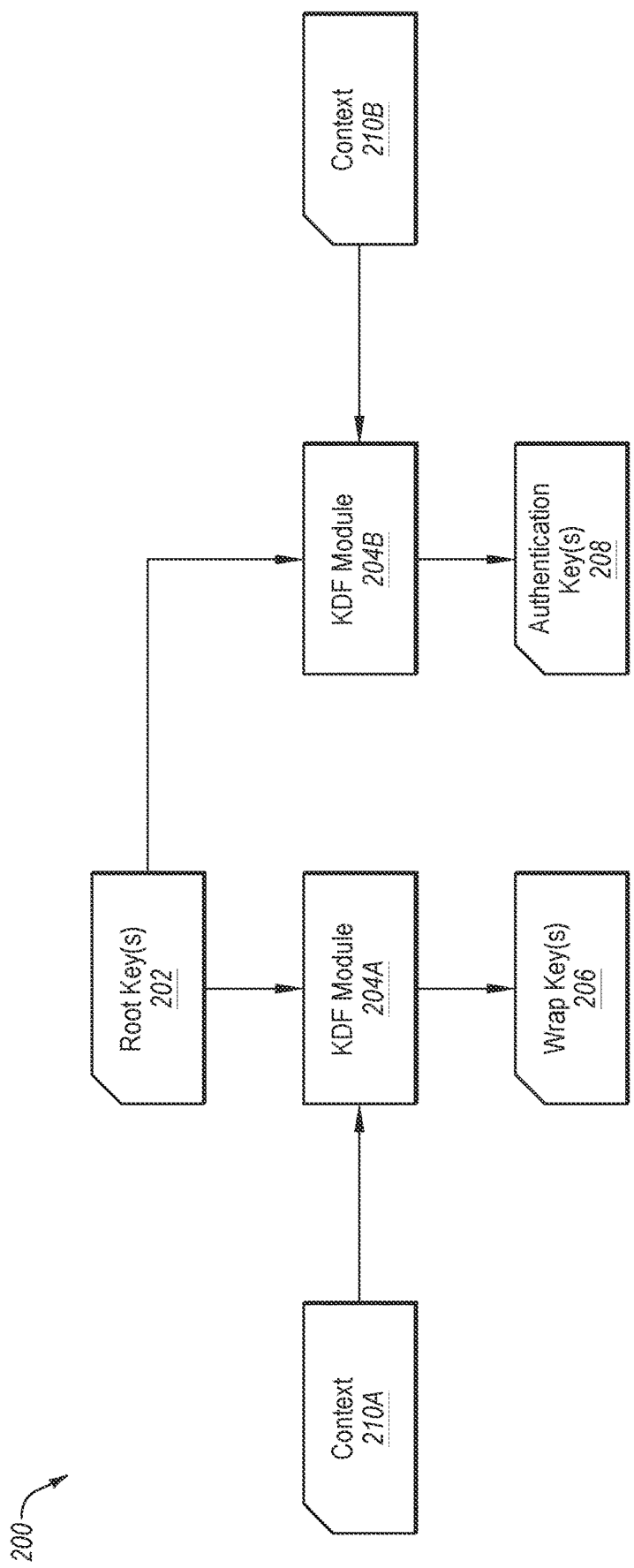
FIG. 2 illustrates an example environment for generating a wrap key and an authentication key based on a root key, in accordance with some embodiments of the present disclosure.

FIG. 2 illustrates an example environment 200 for generating one or more wrap keys 206 and/or one or more authentication keys 208 based on a root key 202, in accordance with some embodiments of the present disclosure. In some embodiments, the one or more wrap keys 206 and/or the one or more authentication keys 208 may be generated using one or more Key Derivation Function modules (KDF modules)—e.g., KDF module 204A and/or KDF module 204B. In some embodiments, the one or more wrap keys 206 and/or the one or more authentication keys 208 may be derived from one or more root keys 202. In these and other embodiments, the one or more KDF modules (e.g., KDF module 204A and/or KDF module 204B) may derive the one or more wrap keys 206 and/or one or more authentication keys 208 using one or more contexts—e.g., context 210A and/or context 210B. In these or other embodiments, one or more of these modules may be implemented using one or more computing devices, such as that described in further detail with respect to FIGS. 4A-4D, 5, and/or 6.

The KDF module 204A may be configured to perform one or more operations on the root key(s) 202 to derive, generate, and/or produce the wrap key(s) 206. In these and other embodiments, the root key(s) 202 may include one or more private data encryption keys from which the wrap key(s) (e.g., wrap key(s) 206) and/or the authentication key(s) (e.g., authentication key(s) 208) may be derived. In these and other embodiments, the root key(s) 202 may be the same as and/or include the root key(s) illustrated and described with respect to the encryption module 106 in FIG. 1 in the present disclosure. In some embodiments, KDF module 204A and the KDF module 204B may both be configured to perform one or more operations using the root key(s) 202.

In some embodiments, the KDF module 204A may be configured to derive and/or generate the wrap key(s) 206 using the root key(s) 202. In some embodiments, the wrap key(s) 206 may be the root key(s) 202 without any operations being performed by the KDF module 204A. In some embodiments, the one or more operations performed by the KDF module 204A may include using one or more KDFs and/or one or more contexts (e.g., context 210A) to derive the wrap key(s) 206 using the root key(s) 202.

In some embodiments, the KDF module 204B may be configured to perform one or more operations that may derive and/or generate the authentication key(s) 208 using the root key(s) 202. In these and other embodiments, the root key(s) 202 may be the same used to derive the wrap key(s) 206 as the root key(s) 202 that may be used to derive the authentication key(s) 208. In some embodiments, the one or more operations performed by the KDF module 204B may include using one or more KDF's and/or one or more contexts (e.g., context 210B) to derive the authentication key(s) 208 using the root key(s) 202.

In some embodiments, a KDF may include a cryptographic algorithm used to derive one or more secrets from the one or more root keys 202. In these and other embodiments, the KDF may include a random and/or a pseudorandom function that may include a cryptographic hash function, a block cipher, or other form of cryptographic algorithm. In these and other embodiments, the KDF used in the KDF module (e.g., KDF module 204A and/or KDF module 204B) may be used to stretch the root key(s) 202 into one or more longer keys, converting the root key(s) 202 into a desired format (e.g., a symmetric key for use with the Advanced Encryption Standard (AES)), and/or deriving a key of the same structure as the root key(s) 202 (e.g., using one or more key separation processes). In these and other embodiments, the wrap key(s) 206 and/or the authentication key(s) 208 may have a predetermined or desired length; for example and without limitation, the wrap key(s) 206 and/or authentication key(s) 208 may have a desired length of 128 bits.

In some embodiments, the KDF that may be used in one or more operations and/or processes in the KDF module 204A and/or KDF module 204B may include one or more types of KDFs. For example, the one or more KDFs may include a password-based key derivation function 2 (PBKDF2), Argon2, Scrypt, HMAC Key Derivation Function (HKDF), and/or any other type of KDFs used to derive the wrap key(s) 206 and/or the authentication key(s) 208 using the root key(s) 202. In some embodiments, the KDFs may include cryptographic functions that may comport with the National Institute of Standards and Technology special publications (NIST SP). For example, the KDF may be compliant with NIST SP 100-108 using one or more Cipher-based Message Authentication Code Pseudo Random Functions (CMAC PRF).

In some embodiments, the KDF module 204A and/or the KDF module 204B may be configured to derive the wrap key(s) 206 and/or the authentication key(s) 208 using contexts 210A and/or contexts 210B, respectively. The one or more contexts (e.g., context 210A and context 210B) may include one or more values and/or vectors that may include any number of data types (e.g., integers, floats, booleans, chars, strings, and/or other data types configured to convey information). In these and other embodiments, the contexts (e.g., context 210A and/or context 210B) may include data and/or information that may be unique to a system (e.g., the system including the secret storage structure and/or the one or more secrets). For example, a system including the secret storage structure may include one or more computer chips. Continuing the example, the chip identification number (chip ID) may be included in the context 210A and/or the context 210B.

In some embodiments, the one or more contexts may be the same used to derive the wrap key(s) 206 and/or the authentication key(s) 208 used to encrypt the secret storage structure and/or the one or more secrets as the one or more contexts used to derive the wrap key(s) 206 and/or the authentication key(s) 208 used to decrypt the one or more secrets and/or the secret storage structure. For example, a first entity may derive a wrap key using a root key and a first context to encrypt the one or more secrets and an authentication key using the root key and a second context to encrypt the secret storage structure. Continuing the example, the first entity may have agreed on the first context and the second context with the second entity prior to encrypting the one or more secrets and/or the secret storage structure. Further, the second entity may use the first context to derive the wrap key to decrypt the one or more secrets and the second entity may additionally use the second context to derive the authentication key to decrypt the secret storage structure. In some embodiments, the context 210A may be the same as the context 210B. In some embodiments, the context 210A and the context 210B may be different.

Figure 3:
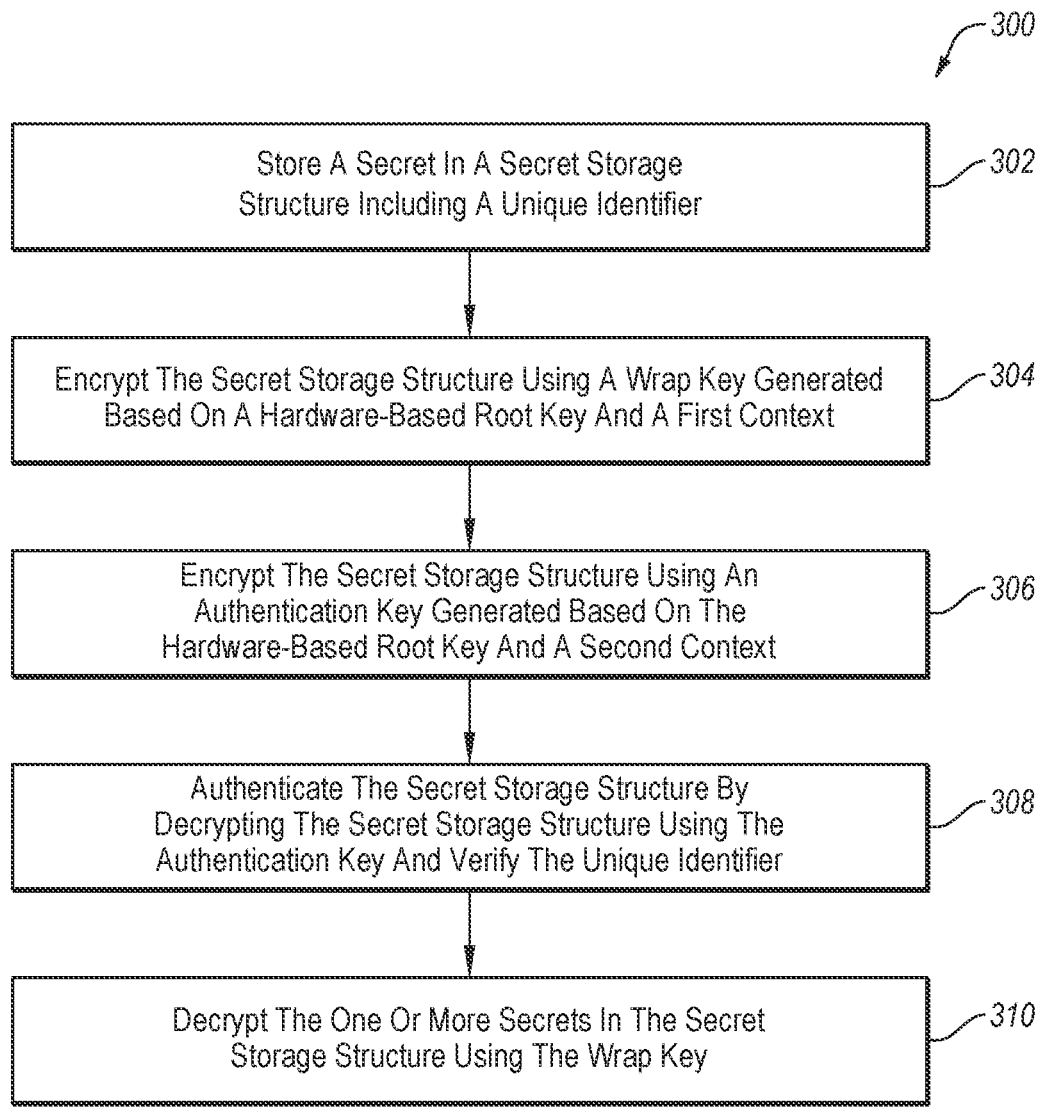
FIG. 3 is a flow diagram showing a method to store, encrypt, and decrypt a secret in a secret storage structure, in accordance with some embodiments of the present disclosure.

FIG. 3 is a flow diagram illustrating a method 300 to encrypt, authenticate, and decrypt a secret storage structure, arranged in accordance with some embodiments of the present disclosure. The method 300 may be performed by any suitable system, apparatus, or device such as, for example the system 100, the encryption module 106, and/or the decryption module 112 of FIG. 1 and, for example, the system 200, the KDF module 204A, the KDF module 204B of FIG. 2, the autonomous vehicle system(s) described with respect to FIGS. 4A-4D, computing device(s) described with respect to FIG. 5, and/or the data system(s) described with respect to FIG. 6 in the present disclosure.

The method 300 may include one or more blocks 302, 304, 306, 308, and 310. Although illustrated with discrete blocks, the operations associated with one or more of the blocks of the method 300 may be divided into additional blocks, combined into fewer blocks, or eliminated, depending on the particular implementation.

In some embodiments, the method 300 may include block 302. At block 302, a secret may be stored in a secret storage structure that may include a unique identifier. In these and other embodiments, the secret may include sensor data, encryption keys, video streams, medical data, client-specific data, device secrets, or other sensitive information that may be designated for protection from disclosure, substitution, and/or compromise such as, for example, the one or more secrets 102A, 102B, up to and including 102$n$ as described and illustrated with respect to FIG. 1A and/or the data structure described and illustrated with respect to FIG. 1B. In some embodiments, the one or more secrets may be fixed in the secret storage structure prior to encrypting the one or more secrets and/or the secret storage structure. Further, in some embodiments, the secret storage structure may include one or more data structures wherein one or more secrets may be stored such as, for example, the secret storage structure 104 as described and illustrated in FIG. 1A, and/or the data structure described and illustrated with respect to FIG. 1C. In some embodiments, the secret storage structure that may include one or more secrets stored thereon may additionally include a unique identifier—e.g., a MAC, an HMAC, a checksum, and/or other unique identifier used to identify data included in the secret storage structure (e.g., one or more bits in the secret storage structure). In some embodiments, the unique identifier may be used to verify that the secret storage structure had not been changed, modified, corrupted, or otherwise altered after having been created. In these and other embodiments, the unique identifier that may be included in the secret storage structure may be described further in the present disclosure, such as, with respect to FIGS. 1A and 1C.

At block 304, the secret storage structure may be encrypted using one or more wrap keys, where the wrap keys may be generated based on a hardware-based root key and a first context. In these and other embodiments, the one or more wrap keys may include one or more private data encryption keys configured to encrypt data associated with one or more secrets such as, for example, the one or more wrap keys described with respect to FIG. 1A with respect to the encryption module 106 in the present disclosure. In some embodiments, the one or more wrap keys may be generated using one or more key derivation functions as described and illustrated with respect to the one or more wrap keys 206 and/or the KDF module 204A in FIG. 2 of the present disclosure. In these and other embodiments, the first context may include one or more values and/or vectors that may be used to derive and/or produce the one or more wrap keys such as, for example, the context 210A described further with respect to FIG. 2 in the present disclosure.

At block 306, the secret storage structure may be encrypted using an authentication key that may be generated based on a hardware-based root key and a second context. In some embodiments, the second context used to derive the authentication key may be the same as the first context used to derive the wrap key. In some embodiments, the authentication key may be described further in the present disclosure, such as, with respect to the encryption module 106 and/or the decryption module 112 in FIG. 1 in the present disclosure. In these and other embodiments, the derivation of the authentication key may be described further with respect to the KDF module 204A and/or the KDF module 204B, such as, described and illustrated with respect to FIG. 2 in the present disclosure. In some embodiments, the one or more authentication keys may be generated using one or more KDFs as described and illustrated with respect to the one or more authentication keys 208 described with respect to FIG. 2 of the present disclosure.

At block 308, the secret storage structure may be authenticated by decrypting the secret storage structure using one or more authentication keys and verifying the unique identifier. In some embodiments, the authentication key(s) used to decrypt the secret storage structure may be the same as the authentication key(s) used to encrypt the secret storage structure. In these and other embodiments, the second context used to derive the authentication key(s) to encrypt the secret storage structure may be the same context used to derive the authentication key(s) used to decrypt the secret storage structure which may allow the system, user, and/or entity decrypting the secret storage structure to verify that the secret storage structure may not have been corrupted or otherwise altered. Additionally or alternatively, the unique identifier may also help verify that the secret storage structure had not been altered or corrupted as described and illustrated further such as with respect to FIGS. 1A, 1C, and 2 in the present disclosure.

At block 310, the one or more secrets stored in the secret storage structure may be decrypted using the wrap key. In some embodiments the wrap key used to decrypt the one or more secrets may be the same as the wrap key used to encrypt the one or more secrets that may be stored in the secret storage structure. In some embodiments, the one or more secrets may be decrypted after the secret storage structure may be decrypted and authenticated. In some embodiments, decrypting the one or more secrets using the wrap key may be described further such as with respect to the decryption module 112 in FIG. 1A in the present disclosure.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 4A:
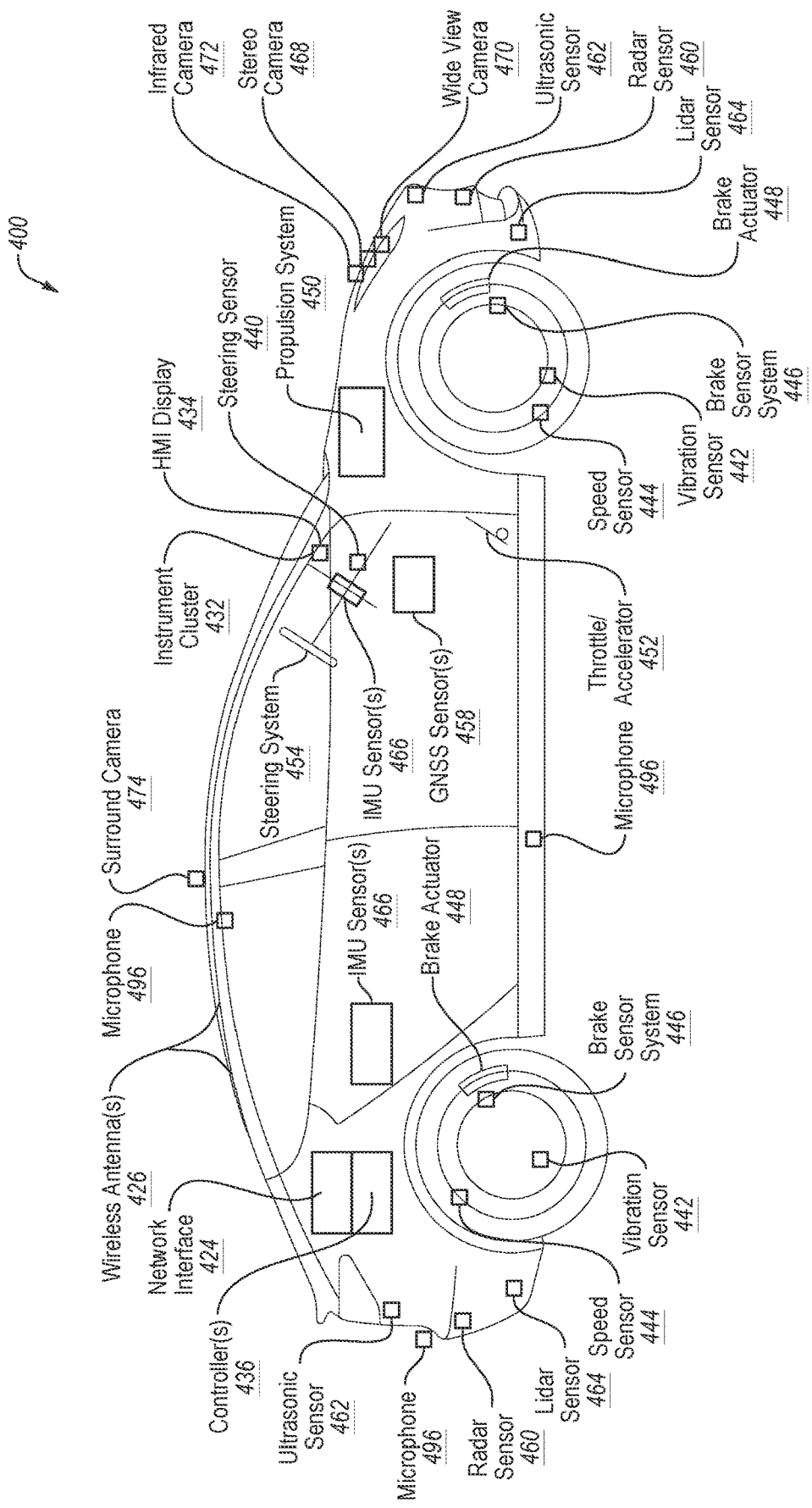
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the vehicle's 400 location, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424 which may use one or more wireless antenna(s) 415 and/or modem(s) to communicate over one or more networks. For example, the network interface 424 may be capable of communication over LTE, WCDMA, UMTS, GSM, CDMA2000, etc. The wireless antenna(s) 415 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
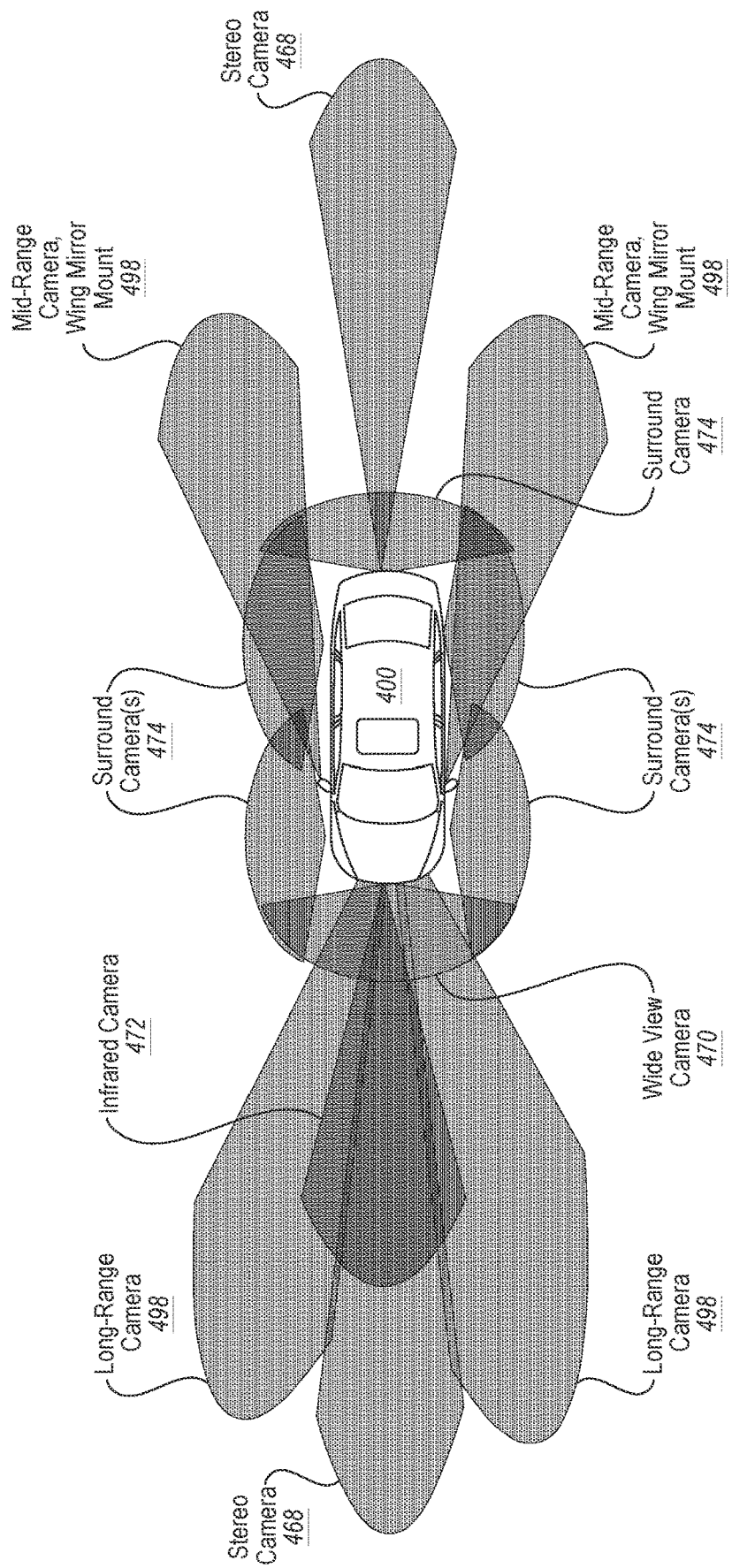
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360 degree camera(s), and/or the like. Four example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
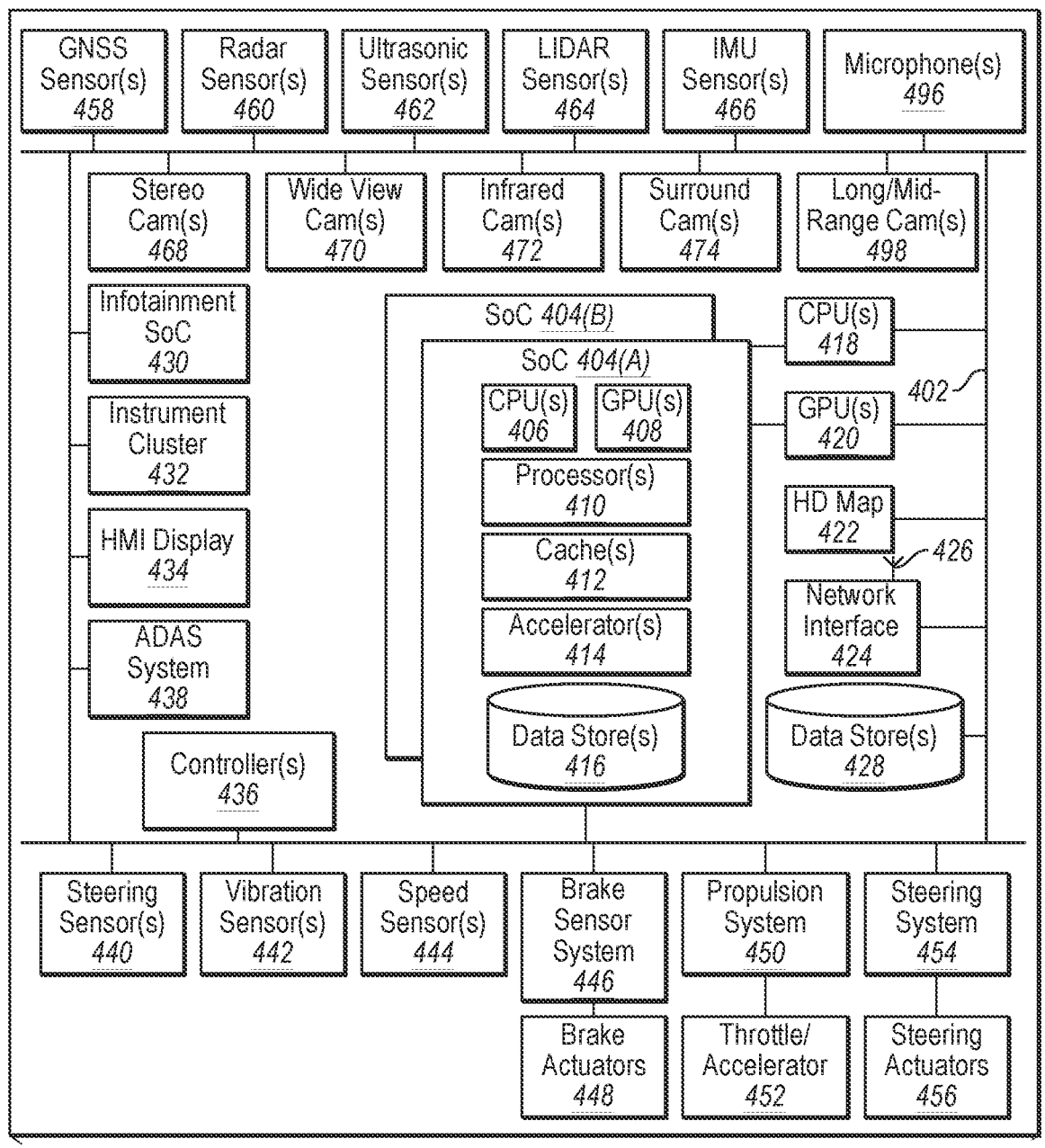
FIG. 4C is a block diagram of an example system architecture for the example autonomous vehicle of FIG. 4A, in accordance with some embodiments of the present disclosure.
Figure 4C:
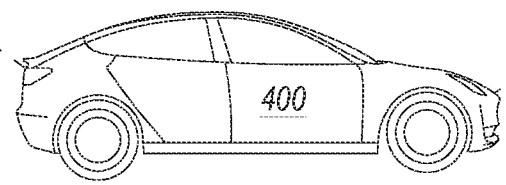

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C are illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400, and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 404 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 412 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high-dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 415 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428 which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPS (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 140 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surroundings at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 1400 m, with an accuracy of 2 cm-3 cm, and with support for a 1400 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 415 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network which is trained and thus reduces the risk of false positives, as described herein.

The vehicle 400 may further include the infotainment SoC 430 (e.g., an in-vehicle infotainment system (IVI)). Although illustrated and described as a SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 400. For example, the infotainment SoC 430 may radios, disk players, navigation systems, video players, USB and Bluetooth connectivity, carputers, in-car entertainment, Wi-Fi, steering wheel audio controls, hands free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
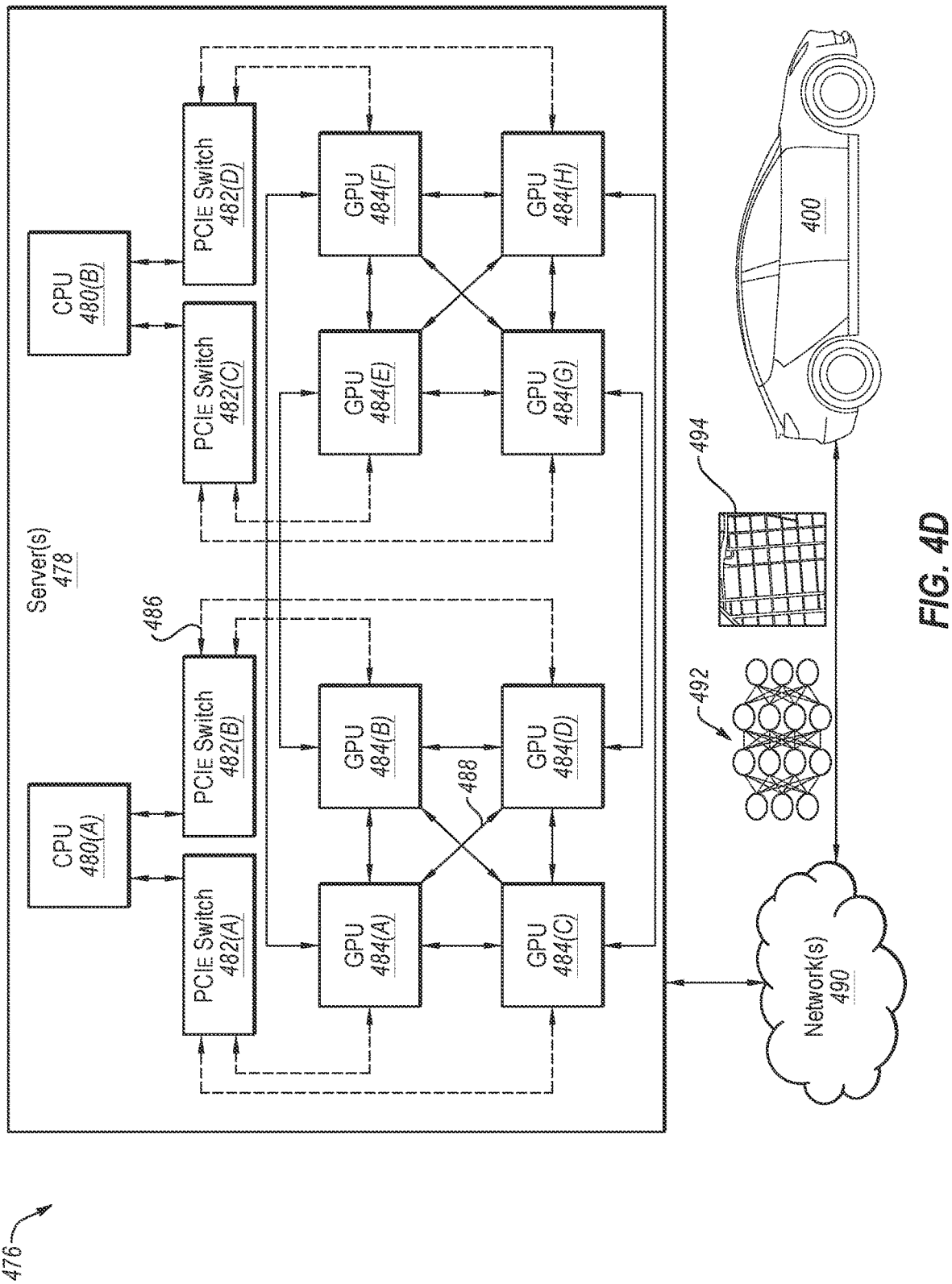
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road-work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
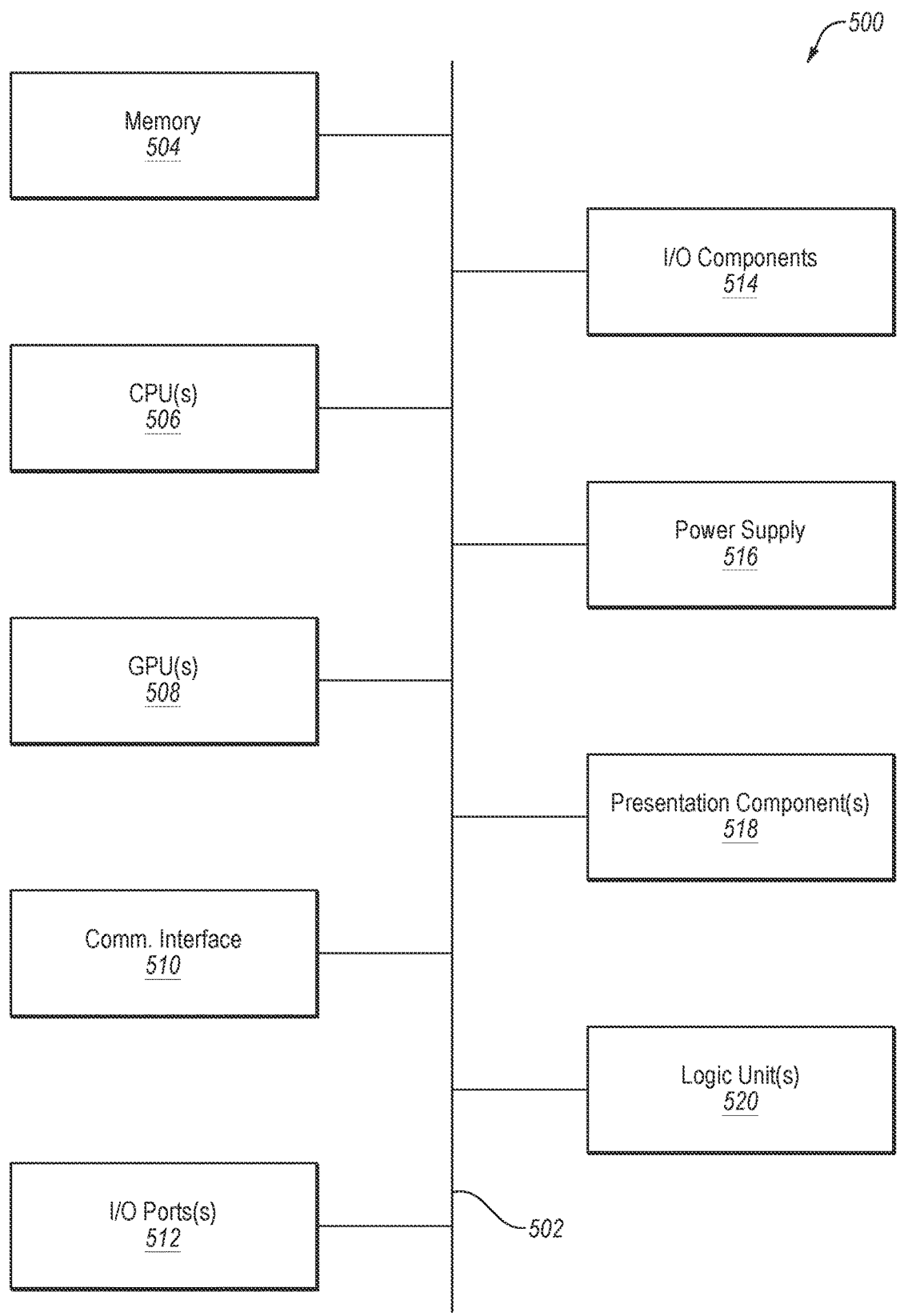
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
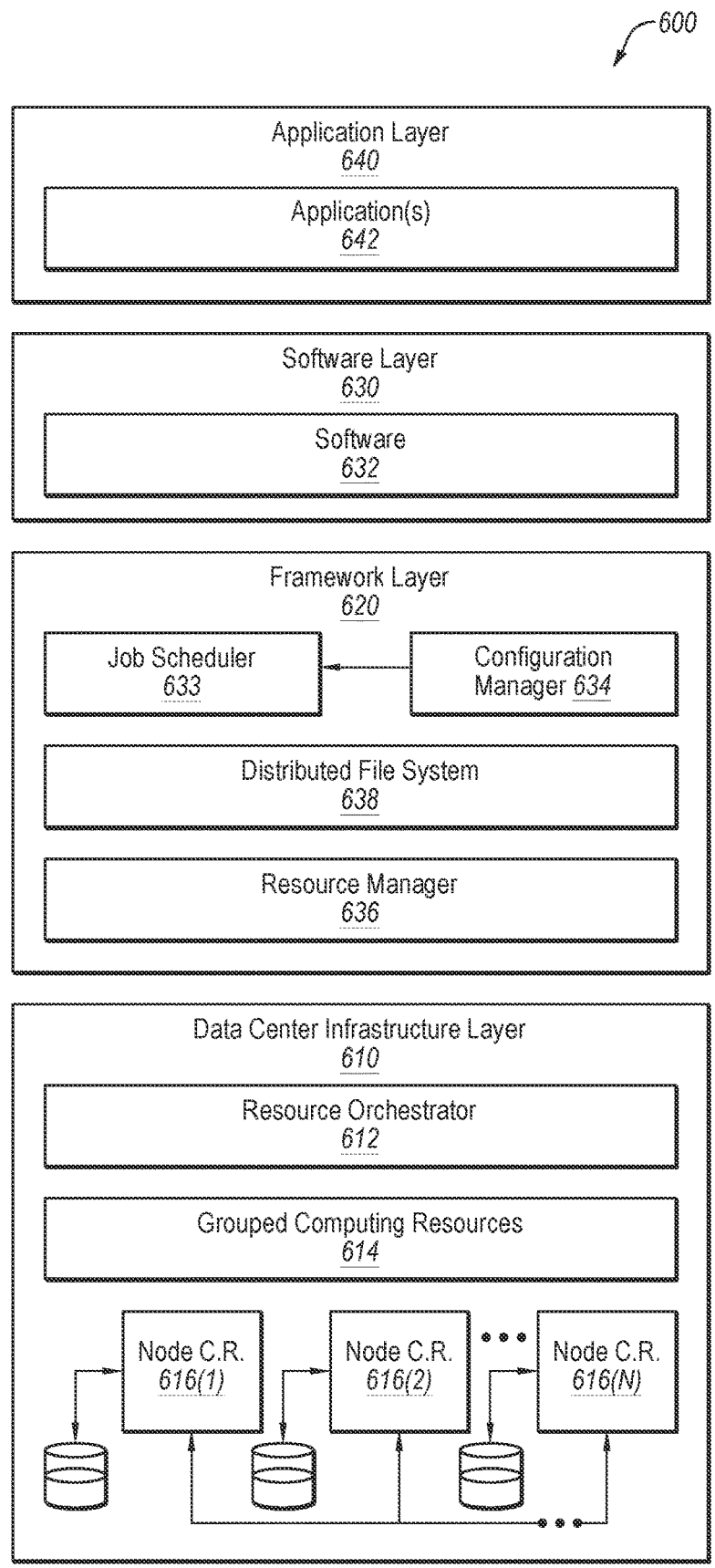
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616 (N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    storing a secret in a secret storage structure; and
    encrypting the secret storage structure, at least, by:
        encrypting the secret using a wrap key that is generated based at least on a hardware-based root key and a first context; and
        encrypting the secret storage structure using an authentication key that is generated based at least on the hardware-based root key that generates the wrap key and a second context.

2. The method of claim 1, wherein the secret storage structure additionally includes a unique identifier, the method further comprising:
    authenticating the secret storage structure, at least, by decrypting the secret storage structure using the authentication key and verifying the unique identifier using a cryptographic algorithm; and
    decrypting the secret in the secret storage structure using the wrap key.

3. The method of claim 1, wherein the hardware-based root key is burned into one or more fuses in hardware associated with the secret storage structure.

4. The method of claim 1, wherein the first context is the same as the second context.

5. The method of claim 1, wherein the first context and the second context include at least one of one or more fixed vectors or unique strings.

6. The method of claim 1, wherein the secret is fixed in the secret storage structure prior to encrypting the secret and the secret storage structure.

7. A system comprising:
    one or more processing units to perform operations comprising:
        storing a plurality of secrets in a secret storage structure; and
        encrypting the secret storage structure, at least, by:
            encrypting the plurality of secrets individually using a wrap key that is generated based at least on a hardware-based root key and a first context; and
            encrypting the secret storage structure using an authentication key that is generated based at least on the hardware-based root key that generates the wrap key and a second context.

8. The system of claim 7, wherein the secret storage structure additionally includes a unique identifier, and the operations further comprise:
    authenticating the secret storage structure, at least, by decrypting the secret storage structure using the authentication key and verifying the unique identifier using a cryptographic algorithm; and
    decrypting the plurality of secrets in the secret storage structure using the wrap key.

9. The system of claim 7, wherein the hardware-based root key is burned into one or more fuses in hardware associated with the secret storage structure.

10. The system of claim 7, wherein the first context is the same as the second context.

11. The system of claim 7, wherein the first context and the second context include one or more fixed vectors.

12. The system of claim 7, wherein the plurality of secrets are fixed in the secret storage structure prior to encrypting the plurality of secrets and the secret storage structure.

13. The system of claim 7, wherein the system is comprised in at least one of:
    a control system for an autonomous or semi-autonomous machine;
    a perception system for an autonomous or semi-autonomous machine;
    a system for performing simulation operations;
    a system for performing digital twin operations;
    a system for performing light transport simulation;
    a system for performing collaborative content creation for 3D assets;
    a system for performing deep learning operations;
    a system for presenting at least one of augmented reality content, virtual reality content, or mixed reality content;
    a system for hosting one or more real-time streaming applications;
    a system implemented using an edge device;
    a system implemented using a robot;
    a system for performing conversational AI operations;
    a system for generating synthetic data;
    a system incorporating one or more virtual machines (VMs);
    a system implemented at least partially in a data center; or
    a system implemented at least partially using cloud computing resources.

14. A processor comprising processing circuitry to perform operations, the operations comprising:
    storing a secret in a secret storage structure; and
    encrypting the secret storage structure, at least, by:
        encrypting the secret using a wrap key that is generated based at least on a hardware-based root key and a first context; and
        encrypting the secret storage structure using an authentication key that is generated based at least on the hardware-based root key that generates the wrap key and a second context.

15. The processor of claim 14, wherein the secret storage structure additionally includes a unique identifier, and the operations further comprise:
    authenticating the secret storage structure, at least, by decrypting the secret storage structure using the authentication key and verifying the unique identifier using a cryptographic algorithm; and
    decrypting the secret in the secret storage structure using the wrap key.

16. The processor of claim 14, wherein the hardware-based root key is burned into one or more fuses in hardware associated with the secret storage structure.

17. The processor of claim 14, wherein the first context is the same as the second context.

18. The processor of claim 14, wherein the first context and the second context include one or more fixed vectors.

19. The processor of claim 14, wherein the secret is fixed in the secret storage structure prior to encrypting the secret and the secret storage structure.

20. The processor of claim 14, wherein the operations are performed by a system and wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system for presenting at least one of augmented reality content, virtual reality content, or mixed reality content;
- a system for hosting one or more real-time streaming applications;
- a system implemented using an edge device;
- a system implemented using a robot;
- a system for performing conversational AI operations;
- a system for generating synthetic data;
- a system incorporating one or more virtual machines (VMs);
- a system implemented at least partially in a data center; or
- a system implemented at least partially using cloud computing resources.

* * * * *